United States Patent
Matheny et al.

[19]

[11] Patent Number: 6,148,314
[45] Date of Patent: Nov. 14, 2000

[54] ROUND INCREMENT IN AN ADDER CIRCUIT

[75] Inventors: David Terrence Matheny; David Vivian Jaggar, both of Austin, Tex.; David James Seal, Cambridge, United Kingdom

[73] Assignee: Arm Limited, Cambridge, United Kingdom

[21] Appl. No.: 09/143,614

[22] Filed: Aug. 28, 1998

[51] Int. Cl.[7] .................................................. G06F 7/50
[52] U.S. Cl. .......................................... 708/497; 708/505
[58] Field of Search .................................. 708/497, 505, 708/551

[56] References Cited

U.S. PATENT DOCUMENTS

| | | | |
|---|---|---|---|
| 4,999,802 | 3/1991 | Cocanougher et al. | 708/508 |
| 5,548,544 | 8/1996 | Matheny et al. | 708/497 |
| 5,568,412 | 10/1996 | Han et al. | 708/497 |
| 5,808,926 | 9/1998 | Gorshtein et al. | 708/497 |
| 5,880,984 | 3/1999 | Burchfiel et al. | 708/497 |

*Primary Examiner*—David H. Malzahn
*Attorney, Agent, or Firm*—Nixon & Vanderhye P.C.

[57] ABSTRACT

A floating point unit is described that performs addition operations. An adder 16 within the floating point unit receives a first input and a second input to generate a sum. This sum is subject to subsequent normalization by a normalizer 60 and rounding by an incrementer 64. If an operation is performed that is immediately followed by an addition operation using the result of the preceding operation, then the normalized but unrounded sum is fed back to the adder 16 together with an indication of its rounding requirement. This rounding requirement can be performed by the adder 16 in parallel with the execution of the following addition by using the carry-in bit of the adder 16 to apply any increment required to rounding of the preceding result.

15 Claims, 4 Drawing Sheets

ROUND INCREMENT IN AN ADDER CIRCUIT

BACKGROUND OF THE INVENTION

1. Field of the Invention

This invention relates to the field of data processing. More particularly, this invention relates to data processing systems including a floating point addition circuit.

2. Description of the Prior Art

It is known to provide data processing systems including a floating point addition circuit. This circuit may be provided individually or together with a multiplier circuit. In the case of a system having an adder circuit and a multiplier circuit, this may be in the form of a multiply-accumulate circuit. In order to improve the performance of such floating point circuits it is known to arrange them in the form of a pipelined system. One of the stages in such pipelined systems is typically normalization and rounding. The rounding step involves both determining that rounding should or should not take place together with incrementing the result if rounding is required. An example of such a system is described in U.S. Pat. No. 4,999,802.

A constant aim within data processing systems is to increase the operating speed. One way of helping to achieve this is to reduce the number of processing cycles needed to perform a desired operation, such as a floating point addition. In a pipelined system, reducing the number of pipeline stages through which an operation must pass before its result is available for use is strongly advantageous as it allows any subsequent processing operation depends upon that result to start to be initiated sooner. Sequences of dependent operations such as the above are relatively common in performance critical fields such as real-time DSP.

SUMMARY OF THE INVENTION

It is an object of the present invention to provide a data processing system that addresses the above mentioned problem of increasing processing speed.

Viewed from one aspect the present invention provides apparatus for performing a floating point addition in which a first operand is added to a second operand, said apparatus comprising:

- an alignment-shifter for floating-point-significance-aligning said first operand to generate an aligned first operand;
- an adder having a first-adder-input and a second-adder-input for adding said aligned first operand input to said first-adder-input to said second operand input to said second-adder-input to generate a sum;
- a normalizer for normalizing said sum to generate a normalized sum,
- a rounding-increment-determination-circuit for generating a rounding signal indicating whether or not said normalized sum should be subject to a rounding-increment, and
- an incrementer responsive to said round signal for incrementing said normalized sum to generate a rounded sum; wherein
- when performing a succeeding floating point addition that uses as one input operand a result of said floating point addition, said normalized sum is fed back as said second operand to said second-adder-input and said rounding signal is used to generate a carry-in input to said adder such that said adder gives effect to any rounding-increment for said normalized sum.

The invention recognizes that when an adder is required to perform a first addition and rounding followed by a second addition that uses the result of the first addition, processing performance can be increased by enabling the second addition to commence processing upon the result of the first addition before that result has been rounded. When rounding up is required the increment that must take place is a relatively slow operation and so avoiding the need to wait for that increment to complete is strongly advantageous. Whilst wishing to avoid the wait for the increment to complete, the correct mathematical result will not be produced unless proper account is taken of whether or not an increment should have occurred. The invention recognizes that the need for an increment can be accommodated in the second addition by feeding any rounding bit required into the otherwise unused carry-in input of the adder. Thus, any increment required after the first addition to take account of rounding is effectively merged into the second addition.

In preferred embodiments, in order to properly take account of the exponent value for the result of the first addition that is being fed back to the adder before the final result of the first addition is known, a shift-amount-calculator that controls the alignment-shifter may be made responsive to the normalizing-shift-amount being applied by the normalizer.

It will be appreciated that subtraction may in practice be carried out by performing an addition with a negation of the appropriate input operand. Subtraction can be considered to be an "unlike-sign-sum" operation. In order to negate the fed back normalized sum it would be usual to complement all of its bits and then add one. A surprising advantage of preferred embodiments of the invention is that any such negation and the requirement to take account of any rounding increment required by the previous operation can be combined together by complementing all of the bits of the normalized sum and complementing the carry-in bit. Complementing the carry-in bit has the same effect as adding one.

When the system is arranged as a pipeline, the normalization stage can be effectively overlapped with the alignment stage when executing successive addition operations. This allows the processing cycle count for the fed back additions to be reduced.

Whilst the invention is applicable to systems only including an adder, it will be appreciated that many real life systems will also contain a multiplier for performing floating point multiplication. When such systems are arranged as a multiply-accumulate unit, any rounding required in the product result can be accommodated by using the carry-in input to the adder in an analogous way to that described above.

The rounding-increment-determination-circuit could determine the rounding required in various different ways. However, in preferred embodiments the rounding-increment-determination-circuit is responsive to the alignment-shifter and the normalizer. The alignment-shifter can provide information (e.g. sticky bits) regarding any bits of the first operand that are less significant than the least significant bit of the second operand. Such bits control, at least partially, whether or not the result of the addition needs to be incremented.

A potential problem with feeding back the normalized sum before any rounding has taken place is that subsequent rounding may alter the exponent value of the result from that of the normalized sum. In order to take account of this, preferred embodiments of the invention provide a bit-width for the alignment-shifter and the adder that is greater than one. Accordingly, any overflow into a more-significant bit position may be accommodated.

Whilst it will be appreciated that the invention could be embodied as discrete components, preferred embodiments of the invention comprising a microprocessor having a floating point unit.

Viewed from another aspect the present invention provides a method of performing a floating point addition in which a first operand is added to a second operand, said apparatus comprising:

floating-point-significance-aligning said first operand to generate an aligned first operand;

using an adder having a first-adder-input and a second-adder-input to add said aligned first operand input to said first-adder-input to said second operand input to said second-adder-input to generate a sum;

normalizing said sum to generate a normalized sum;

generating a rounding signal indicating whether or not said normalized sum should be subject to a rounding-increment; and in response to said round signal, incrementing said normalized sum to generate a rounded sum; wherein when performing a succeeding floating point addition that uses as one input operand a result of said floating point addition, said normalized sum is fed back as said second operand to said second-adder-input and said rounding signal is used to generate a carry-in input to said adder such that said adder gives effect to any rounding-increment for said normalized sum.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
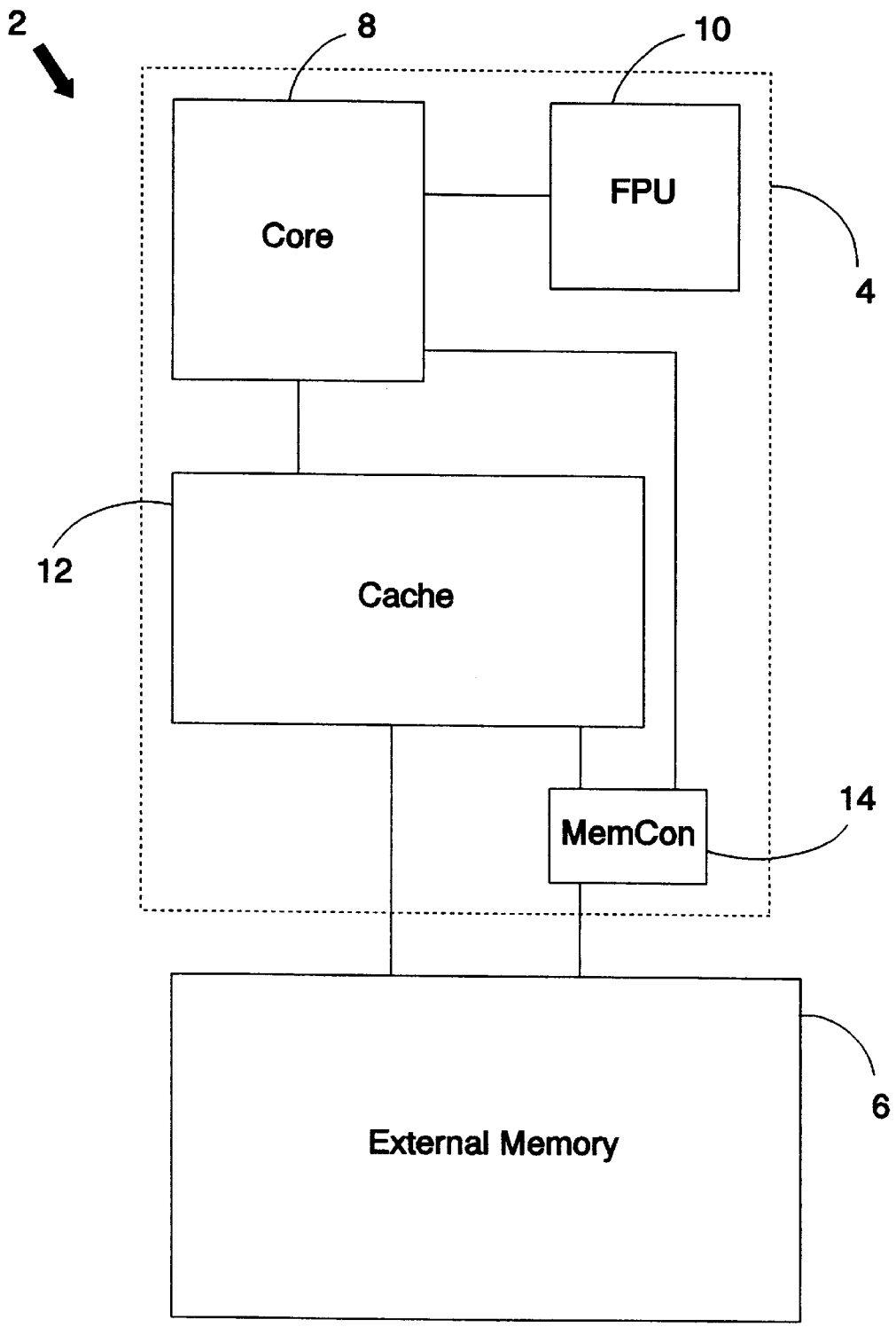
FIG. 1 illustrates a data processing system incorporating a microprocessor with a floating point unit.

FIG. 1 schematically illustrates a data processing system 2 comprising a microprocessor 4 and an external memory 6. The microprocessor 4 includes a core 8, a floating point unit coprocessor 10, a cache 12 and a memory controller 14. In operation the floating point unit coprocessor 10 provides, among other operations, multiply-accumulate operations in response multiply-accumulate instructions. The reading and writing of operands and results to and from the floating point unit coprocessor 10 is controlled by the core 8. The core 8 reads and writes data from and to the memory (both the cache 12 and the external memory 6) in cooperation with the memory controller 14.

Figure 2A:
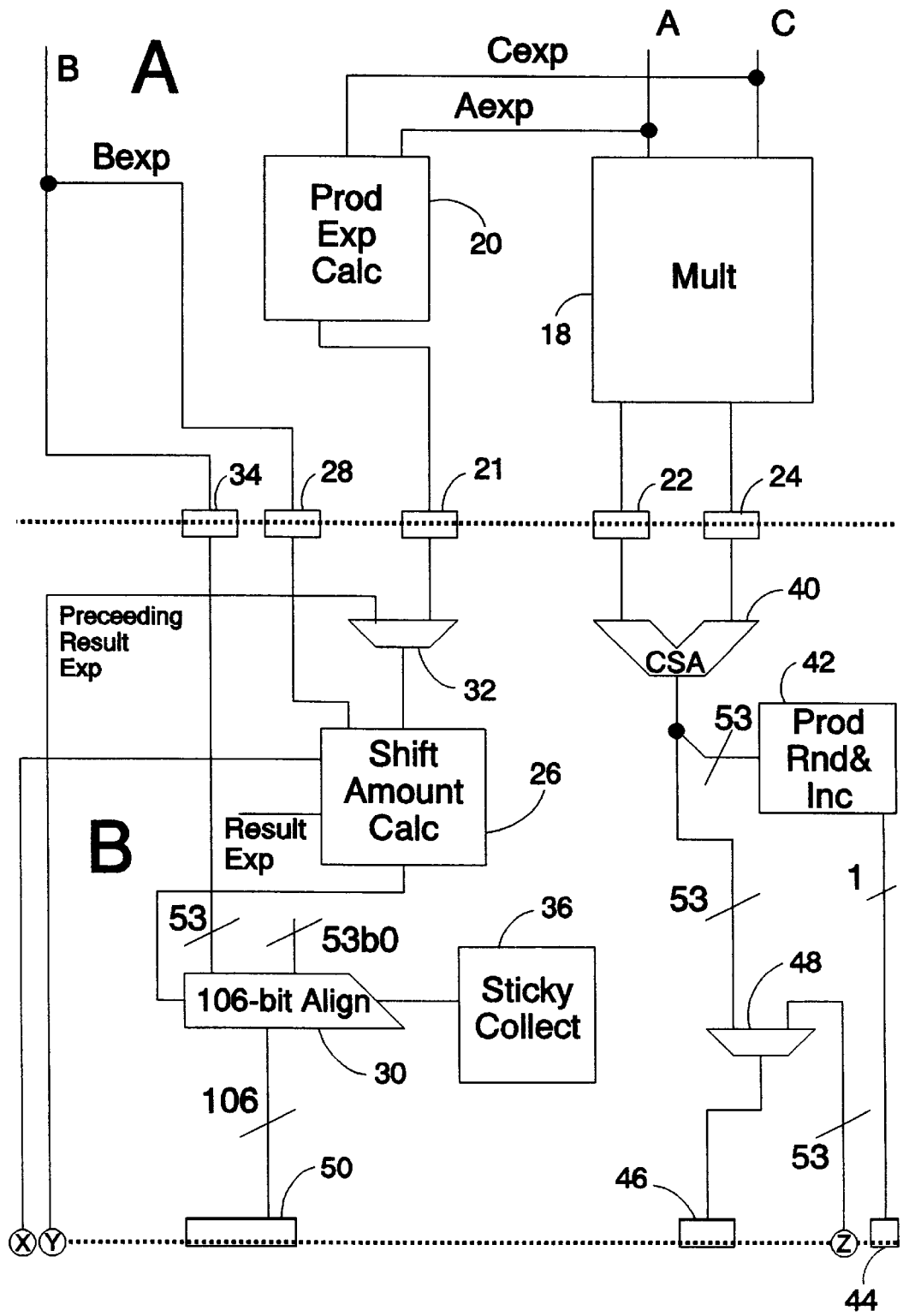
FIGS. 2A and 2B together schematically illustrate the multiply-accumulate portion of a floating point unit.
Figure 2B:
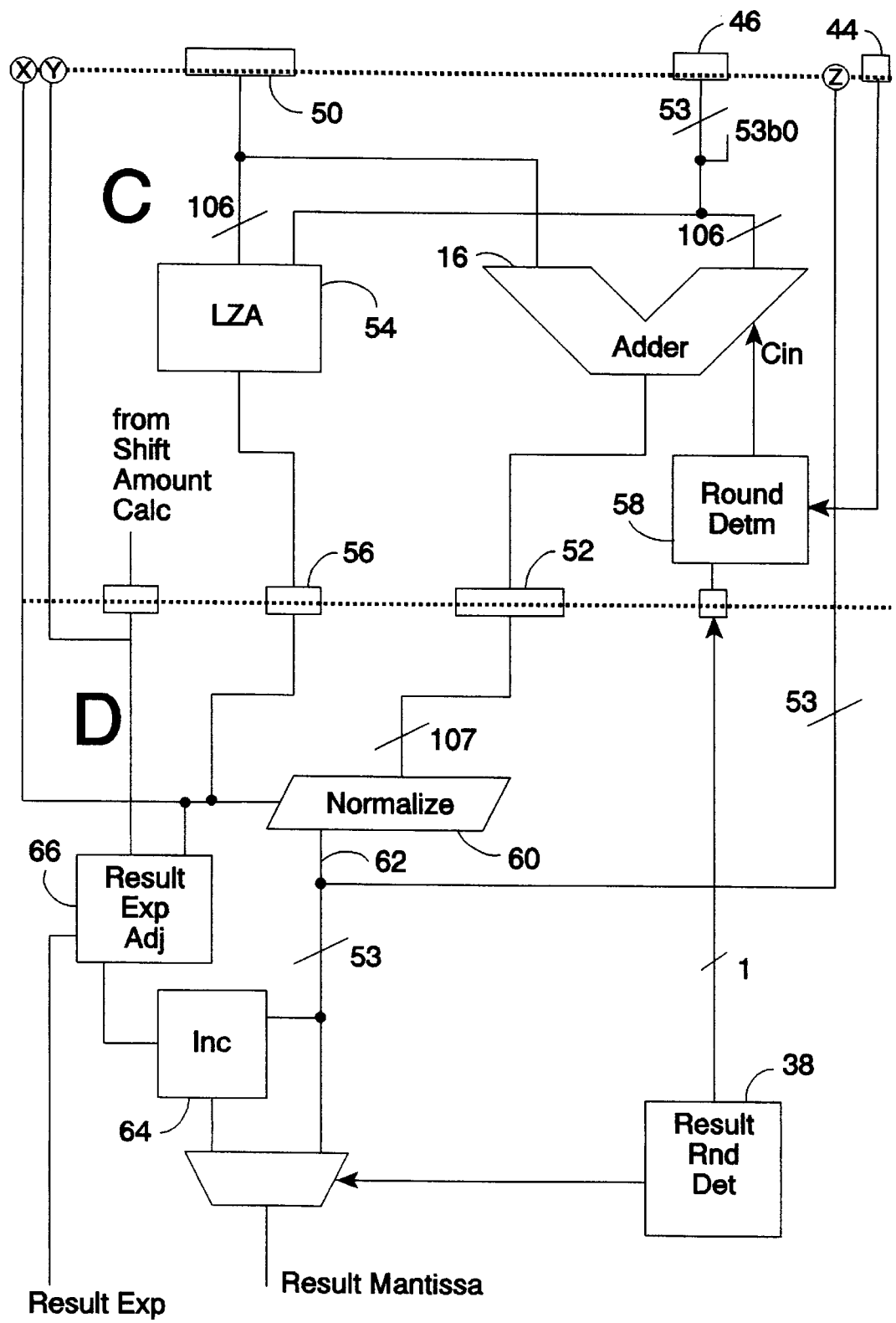

FIGS. 2A and 2B together schematically illustrate a portion of the datapath through the floating point unit coprocessor 10. More particularly, FIGS. 2A and 2B show a multiply-accumulate unit in which the final stage of rounding for a result that is being fed back for a subsequent addition operation is achieved by setting the carry-in input to an adder 16 that is performing that subsequent addition.

The first stage in the multiply-accumulate unit is a multiplier stage A. Within this stage, a multiplier 18 calculates a carry-save representation of the product (A*C). At the same time a product-exponent-calculator 20 responsive to the multiplier inputs A, C determines the exponent of the product. At the end of stage A, the carry-save representation of the product (A*C) is stored within carry-save latches 22, 24. The calculated product exponent is stored within a product exponent latch 21.

The second stage of the pipeline B performs the relative alignment of the product (A*C) with the addend B before they are summed. A shift-amount-calculator 26 is responsive to the addend exponent stored within an addend exponent latch 28 and the product exponent within the product exponent latch 21 to calculate a shift-amount-value that should be applied by an alignment-shifter 30. When the result of the preceding operation is being fed back for a subsequent addition operation, a multiplexer 32 uses the exponent of the previous result in place of the product exponent as an input to the shift-amount-calculator 26.

The alignment-shifter 30 receives the 53 bits of the mantissa of the addend B from an addend mantissa latch 34 together with 53 lower order zero bits. The addend mantissa is initially aligned in its leftmost position as it is input to the alignment-shifter 30. The alignment-shifter 30 right shifts the addend mantissa by up to 106 bit positions. Any bits that "fall" off the right end of the alignment-shifter 30 are input to a sticky-collector 36 that uses them to determine the sticky-bits that are subsequently input to a final result rounding determination circuit 38.

The carry-save product representation within the carry-save latches 22, 24 is carry-save added by a carry-save adder 40. Any product rounding and increment necessary in the output of the carry-save adder 40 is determined by product rounding determination circuit 42 and then latched within a product rounding latch 44. The output of the carry-save adder 40 passes to a second operand latch 46 via a feedback-multiplexer 48. The 106 bit aligned output of the alignment-shifter 30 is stored within a first operand latch 50.

The third stage of the pipelined C is the adder stage and contains the 106 bit adder 16. The second input operand to the adder 16 is leading-zero extended with 53 zeros having been read from the second operand latch 46. The first operand from the first operand latch 50 is supplied to the first input of the adder 16. The output of the adder 16 is a sum value that is stored within a sum latch 52. The first operand and the second operand are also supplied to a leading-zero-anticipator 54 the output of which is stored in a leading zero result latch 56.

A rounding determination circuit 58 is responsive to a number of inputs, such as the rounding requirement of a preceding operation for which the result was fed back early, to calculate a value for a carry-in signal to the adder 16. The rounding determination circuit 58 can also receive a rounding requirement signal for the product (A*C) via latch 44. Further inputs to the rounding determination circuit 58 may be a signal indicating an unlike-sign-sum operation from a separate floating point unit controller (not shown). Such an unlike-sign-sum indication will cause any previously calculated carry-in it to be complemented. If no result is being fed back from the final stage D, then the carry-in input will not reflect the rounding requirement of the preceding result since this will not be the value that is passing through the adder 16.

The final stage D contains a normalizer that receives the sum from the sum latch 52 to generate a normalized sum on a 53 bit signal line 62 that selectively fed back to the adder 16 to form the second input via the feedback multiplexer 48. The feedback multiplexer 48 is controlled by a pipelined controller that identifies (using standard opcode comparison techniques) a subsequent addition operation that reuses the result of the preceding operation and triggers the feedback of the normalized sum and its rounding requirement to the adder 16 and the rounding determination circuit 58 respectively.

The final result rounding determination circuit 38 within the final stage D operates in a conventional manner to determine the rounding requirement of the normalized sum. If a rounding increment is required, then this is performed by an incrementer 64. The initially calculated result exponent from the shift-amount-calculator 26 is subjected any adjustment required due to the incrementer 64 using a result exponent adjustment circuit 66 to generate a final result exponent value.

In summary, during normal operation rounding is performed in the final stage D only. However, when a result is being fed back to the adder 16, then it is fed back in the form of the normalized sum before any rounding and any rounding requirement is accommodated by setting the carry-in bit to the adder 16. This feedback allows the operation of the normalizer 60 to be overlapped with the operation of the alignment-shifter 30. In this example, this allows a stream of addition operations that each reuse the previous result to the performed in only 2 processing cycles each.

Figure 3:
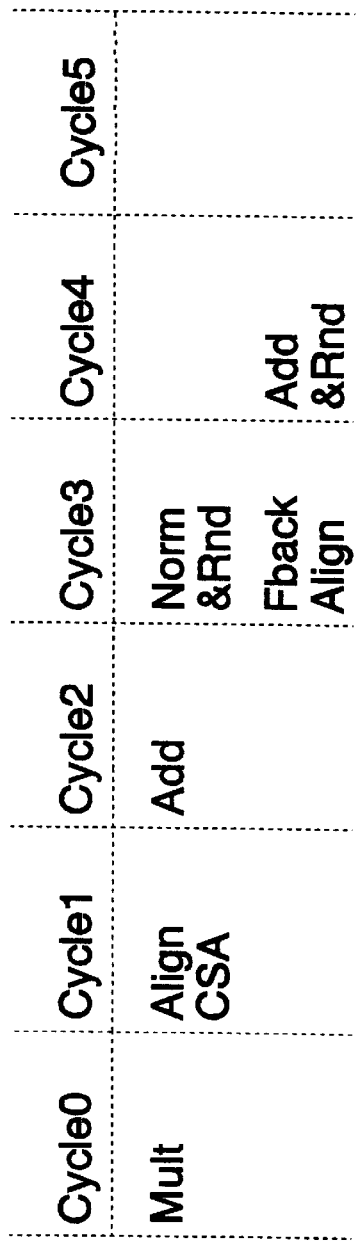
FIG. 3 illustrates the processing tasks performed within processing cycles corresponding to a multiply-accumulate (i.e. incorporating a first addition) followed by a second addition that uses the result of that first addition.

FIG. 3 illustrates a multiply-accumulate operation that requires 4 processing cycles immediately followed by an addition operation using the result of the multiply-accumulate operation. It will be appreciated that the multiply-accumulate operation could be replaced by a different operation, such as a simple addition. (It is also possible that the mutliply result could come from a completely separate unit.) In cycle 0, the multiplier 18 performs a single-cycle multiply. In cycle 1, the output of the multiplier 18 is carry-save added and the addend is aligned. In cycle 2, the product and the addend are summed by the adder 16. In cycle 3, the normalization and rounding of the multiply-accumulate operation is performed in stage D to generating a final result. In parallel with this, the normalized but unrounded result is fed back to the adder 16 together with its rounding requirement. The alignment of the other input to the subsequent addition is also performed in cycle 3. In cycle 4, the actual add within the adder 16 for the subsequent addition is performed.

Figure 4:
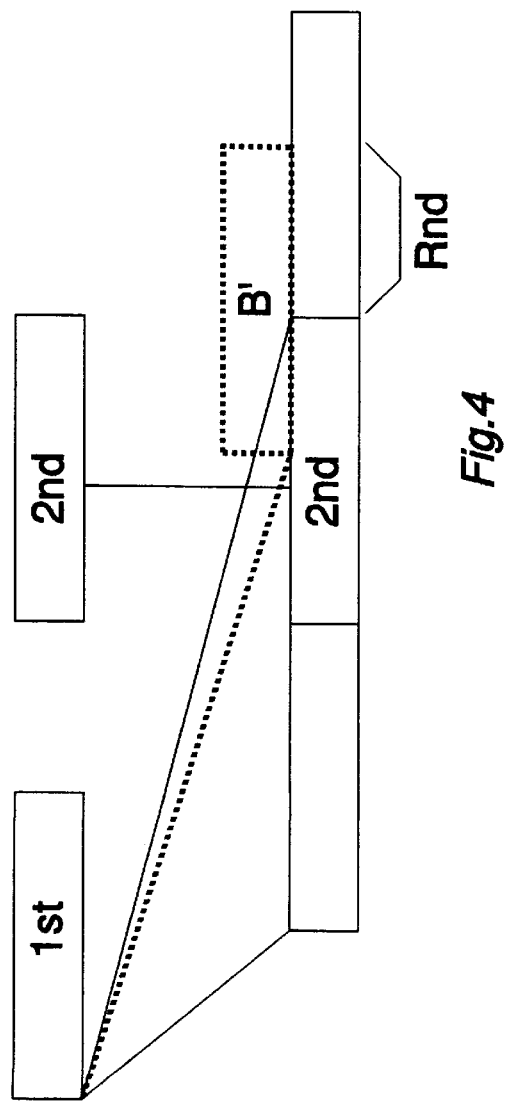
FIG. 4 illustrates the alignment-shifting between a first operand and a second operand.

FIG. 4 illustrates the alignment of the first operand and the second operand. The first operand is started at its leftmost possible position and is subject to up to 106 bits of right shift. In the case illustrated with dotted lines in FIG. 4, the first operand is right shifted sufficiently that some of its least significant bits no longer overlapped with the second operand and have effectively "fallen off" the bottom of the result. These bits can alter the final result in that they at least partially control the rounding that should be applied to the result via the sticky bits.

Although particular embodiments of the invention have been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Apparatus for performing a floating point addition in which a first operand is added to a second operand, said apparatus comprising:

an alignment-shifter for floating-point-significance-aligning said first operand to generate an aligned first operand;

an adder having a first-adder-input and a second-adder-input for adding said aligned first operand input to said first-adder-input to said second operand input to said second-adder-input to generate a sum;

a normalizer for normalizing said sum to generate a normalized sum;

a rounding-increment-determination-circuit for generating a rounding signal indicating whether or not said normalized sum should be subject to a rounding-increment; and an incrementer responsive to said round signal for incrementing said normalized sum to generate a rounded sum; wherein when performing a succeeding floating point addition that uses as one input operand a result of said floating point addition, said normalized sum is fed back as said second operand to said second-adder-input and said rounding signal is used to generate a carry-in input to said adder such that said adder gives effect to any rounding-increment for said normalized sum.

2. Apparatus as claimed in claim 1, wherein said alignment-shifter is responsive to a shift-value calculated by a shift-amount-calculator.

3. Apparatus as claimed in claim 2, wherein, when said normalized sum is being input to said second-adder-input, shift-amount-calculator is responsive to a normalizing-shift-amount applied by said normalizer and an exponent value of said first operand.

4. Apparatus as claimed in claim 1, wherein, when said succeeding floating point addition is an unlike-sign-sum operation, said normalized sum and said carry-in input are complemented.

5. Apparatus as claimed in claim 1, wherein said apparatus arranged as a multiple-stage pipeline.

6. Apparatus as claimed in claim 5, wherein said alignment-shifter is in a pipeline stage proceeding a pipeline stage of said adder.

7. Apparatus as claimed in claim 6, wherein said normalizer is in a pipeline stage succeeding said pipeline stage of said adder.

8. Apparatus as claimed in claim 7, wherein, when performing said succeeding floating point addition, said normalizer operates in parallel with said alignment-shifter.

9. Apparatus as claimed in claim 1, wherein said apparatus is a multiply-accumulate circuit having a multiplier for generating a product that forms said second operand.

10. Apparatus as claimed in claim 9, wherein a multiplier-rounding-increment-determination-circuit generates a multiplier-rounding signal indicating whether or not said product should be subject to a rounding-increment and said carry-in signal is responsive to said multiplier-rounding signal to give effect to any rounding-increment for said product.

11. Apparatus as claimed in claim 1, wherein said a rounding-increment-determination-circuit is responsive to at least one of said alignment-shifter and said normalizer when generating said rounding signal.

12. Apparatus as claimed in claim 1, wherein said alignment-shifter and said adder have a bit-width accommodating more than one bit representing a non-fractional portion of a mantissa value being manipulated.

13. Apparatus as claimed in claim 12, wherein said alignment-shifter is controlled by a shift-amount-calculator responsive to exponent values of said first operand and said second operand and, when performing said succeeding floating point operation, said shift-amount-calculator is also responsive to said more than one bit representing a non-fractional portion of a mantissa value being manipulated.

14. Apparatus as claimed in claim 1, wherein said apparatus comprises a microprocessor having a floating point unit.

15. A method of performing a floating point addition in which a first operand is added to a second operand, said apparatus comprising:

floating-point-significance-aligning said first operand to generate an aligned first operand;

using an adder having a first-adder-input and a second-adder-input to add said aligned first operand input to said first-adder-input to said second operand input to said second-adder-input to generate a sum;

normalizing said sum to generate a normalized sum;

generating a rounding signal indicating whether or not said normalized sum should be subject to a rounding-increment; and in response to said round signal, incrementing said normalized sum to generate a rounded sum; wherein when performing a succeeding floating point addition that uses as one input operand a result of said floating point addition, said normalized sum is fed back as said second operand to said second-adder-input and said rounding signal is used to generate a carry-in input to said adder such that said adder gives effect to any rounding-increment for said normalized sum.

* * * * *